March 27, 1956 T. V. GODSIL 2,739,446

POWER TRANSMISSION

Filed Dec. 6, 1954

INVENTOR.
THOMAS V. GODSIL

BY
Ralph L. Tweedale

ATTORNEY

United States Patent Office 2,739,446

Patented Mar. 27, 1956

2,739,446

POWER TRANSMISSION

Thomas V. Godsil, Detroit, Mich., assignor to Vickers Incorporated, Detroit, Mich., a corporation of Michigan Application December 6, 1954, Serial No. 473,199

5 Claims. (Cl. 60—52)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficient high for satisfactory accessory operation. As engine speed increases, so also does the discharge rate of the pumping mechanism. In the usual motor vehicle the ratio of engine idle speed to top speed is approximately one to ten. Thus, there is an over-supply of fluid at all times when engine speeds are substantially above idle. Where precise control is required, as in steering, this variable over-supply presents a serious problem.

The prior art has attacked the problem of fluid over-supply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased by-pass fluid. Such a spill-over type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve. Due to the spring rate, an increasing pressure differential is required to move the by-pass valve from the cracking position to the wide open position. Since the valve actuating pressure differential is proportional to flow rate to the work, flow rate to the work must increase as the valve moves from cracking to wide open. The consequent variation in flow rate to the work resulting from variations in pump speed above the valve cracking point is of substantial magnitude and has been found detrimental to precise control in such applications as steering systems.

It is an object of this invention to provide an improved, low cost fluid flow control system for delivering a substantially constant fluid flow rate to a load from a variable flow rate source.

It is a further object to provide such a system in which the flow rate is more accurately controlled than in prior devices.

Another object is to provide such a system which is well adapted for application to conventional pumping structures.

It is also an object to provide low cost pumping structure having such a system incorporated therein.

Further objects and advantages of the present invention will be apparent from the following description, reference being had to the accompanying drawing wherein a preferred form of the present invention is clearly shown.

Figure 1:
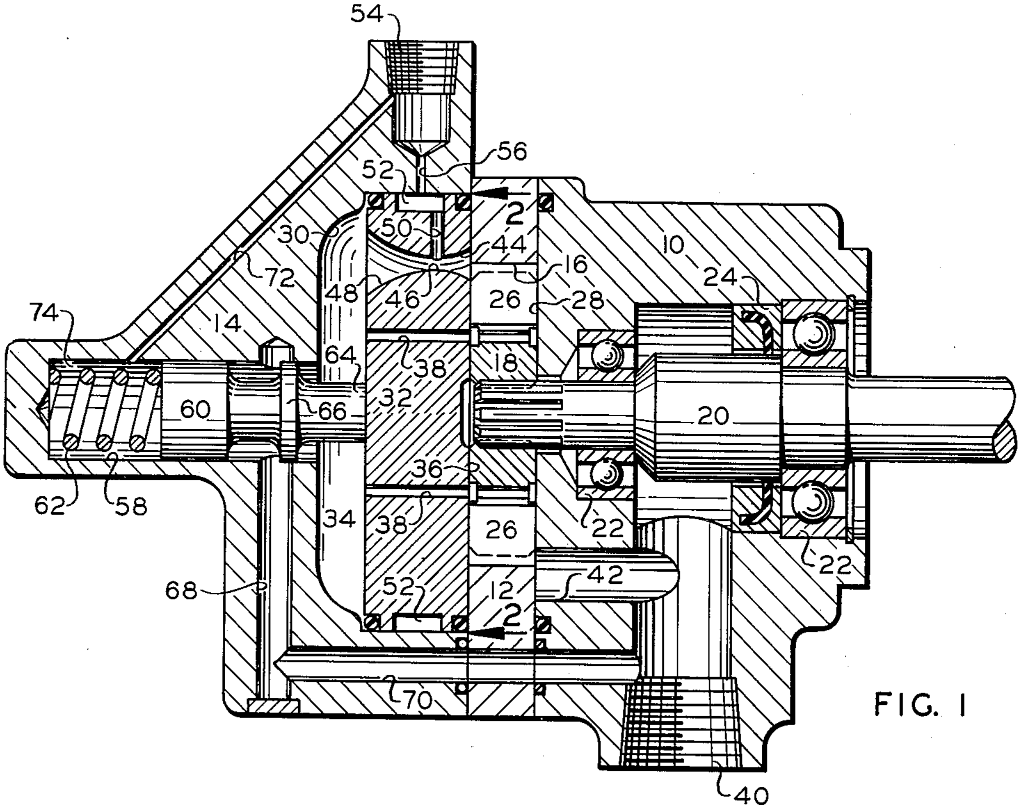
Figure 1 is a longitudinal sectional view of pumping structure which incorporates the present invention.

Referring now to Figure 1 there is shown pumping structure of the general type described in the patent to Gardiner et al., No. 2,544,988. The pumping structure includes a body member 10, a ring 12, and a head 14. The ring 12 has an elliptically shaped chamber 16 in which a rotor 18 is disposed. Rotor 18 is supported on and driven by a drive shaft 20 which is rotatably carried by bearings 22 in the body member 10. The usual shaft seal 24 is provided to prevent leakage from the body 10 at the point of emergence therefrom of the shaft 20. Rotor 18 has a plurality of radial slots therein each of which carries a vane 26. The vanes 26 extend from rotor 18 to abut the elliptical track of chamber 16. Rotor 18, ring 12, and vanes 26 are axially abutted at one side by a plane face 28 of the body member 10.

The head 14 includes a recess 30 in which is positioned a pressure plate 32. The periphery of pressure plate 32 engages the chamber 30 in a fluid sealing relation therewith to form a pressure chamber 34. Fluid pressure in chamber 34 urges the plane face 36 of pressure plate 32 into axial abutment with ring 12, rotor 18, and vanes 26. Pressure in chamber 34 is conducted to the under side of vanes 26 through a plurality of passages 38 in pressure plate 32. An external inlet connection port 40 in the body 10 communicates with the expanding intervane working chambers through a pair of inlet ports 42, only one of which is shown in Figure 1. The pumping structure thus far described is similar in nature to that in the Gardiner et al. patent. A more detailed description may be obtained by reference to that patent.

The contracting intervane working chambers discharge fluid into a pair of kidney-shaped discharge ports 44, only one of which is shown in Figure 1. The ports 44 extend through the pressure plate 32, and, for most effective practice of the invention, differ from conventional ports in that they have constricted throats 46 and flare outward at 48 to open into the pressure chamber 34. A plurality of drilled passages 50 extend radially inward from an annular peripheral groove 52 in pressure plate 32 to communicate with the delivery ports in the constricted throat portions 46. An external delivery connection port 54 extends into the head 14 and communicates through a metering restriction 56 with the groove 52.

There is provided in head 14 a valve bore 58 which receives a flow control valve 60. A spring 62 biases valve 60 to the position illustrated wherein the valve nose 64 abuts pressure plate 32. Valve 60 includes a land 66 which, in the spring biased position illustrated, blocks communication between the pressure chamber 34 and a transverse by-pass passage 68 which intersects the bore 58. An axial passage 70 extends from passage 68 through head 14, ring 12, and body 10 to communicate with the inlet passages in body 10.

A drilled passage 72 extends from the port 54 at a point outward of restriction 56 to communicate with the spring chamber 74 associated with valve 60. It will be seen that equal and opposed areas of valve 60 are respectively exposed to pressures in spring chamber 74 and in pressure chamber 34.

Figure 3:
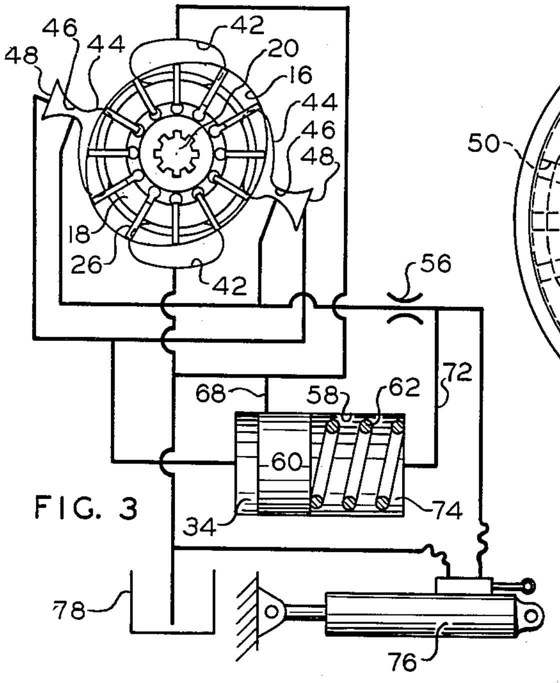
Figure 3 is a schematic circuit diagram illustrating the present invention.
Figure 2:
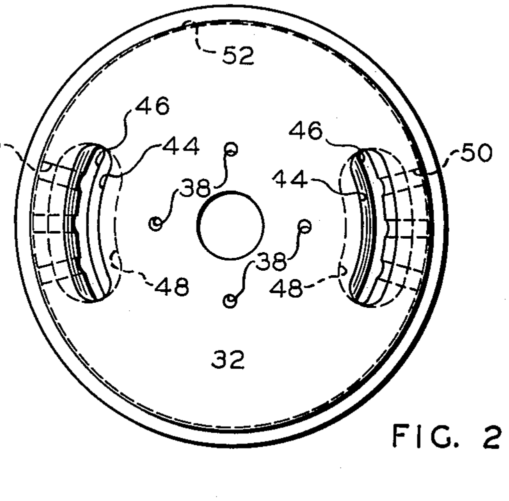
Figure 2 is a view of part of the pumping structure taken on line 2—2 of Figure 1.

Referring now to Figure 3, rotor 18 and the elliptical pumping chamber 16 are shown to a reduced scale. The inlet ports 42 and the discharge ports 44 are illustrated in the positional relation in which they actually overlie the working space between the ring and rotor. The constricted throats 46 and the flared portions 48 associated with the discharge ports 44 are schematically indicated in Figure 3, as is the pressure chamber 34. A work load is indicated at 76 in Figure 3 and a fluid reservoir 78 has been provided. It can be clearly seen in the drawing that fluid which is supplied to the work through the metering restriction 56 is taken from the discharge ports 44 in the region of the constrictions 46.

As heretofore noted, with conventional spill-over type flow control units there is an undesirably great increase in metered flow as pump speed increases from the valve cracking point to the point at which the valve is wide open. The present invention provides a system which greatly limits that increase. This is accomplished by supplementing the differential pressure signal derived from flow rate to the work by a signal derived from the speed of the pumping unit, as reflected in the discharge flow rate of the pump. The valve operating pressure differential is thus derived in part as a function of flow rate to the work, and in part as a function of pump speed. Since a portion of the valve operating differential is obtained from other than the flow rate to the work, the valve can be moved from cracking to the full open position with a smaller increase in flow rate to the work than is possible in conventional systems.

In the illustrated, preferred embodiment of the present invention, the venturi-shaped outlet ports 44 are utilized to produce a supplemental pressure differential at pump speeds above the cracking point of the flow control valve. This supplemental differential is dependent primarily on the pump speed, as reflected in increased pumping rate. This can best be seen by considering the operation of the device.

In operation, with the variable speed prime mover driving shaft 20 at a low, or idling speed, the entire quantity of fluid pumped will pass from the pumping chambers and into the discharge ports 44, from which it will pass through the radial passages 50 and into the groove 52 to be conducted to the metering restriction 56. All the fluid being pumped will pass through metering restriction 56 and port 54 to the work. During such low speed operation, the spring 62 will maintain valve 60 in the position illustrated, wherein pressure chamber 34 is isolated from the by-pass passage 68 leading to the pump inlet passages. The pressure in pressure chamber 34 will be substantially equal to that pressure existing immediately upstream of the metering restriction 56. This pressure will be imposed on the area of the inner end of the valve spool 60, and acts thereon in a direction to open the valve. Pressure from a point immediately downstream of metering restriction 56 will be conducted through the passage 72 to the spring chamber 74, where it will be imposed on the outer end of valve spool 60, acting thereon in a direction such as to aid spring 62 in maintaining valve 60 closed. It will thus be seen that pressures upstream and downstream of metering restriction 56 act on equal opposed areas of valve 60.

As the speed of the pumping mechanism is increased, the discharge rate will also increase. A point will be reached at which the pressure drop across the metering restriction 56 reacting across the valve 60 will overcome the spring 62 thus shifting the valve to the cracking position, in which initial communication is established between pressure chamber 34 and the by-pass passage 68. Further increases in pump speed beyond this point will induce a greater pressure drop across the metering restriction 56 thus causing valve 60 to open wider. Once fluid diversion by valve 60 has commenced, the pressure differential across metering restriction 56 is supplemented by a pressure differential which is dependent on the speed of the pumping mechanism. The supplemental differential is derived from the flow of fluid through the discharge ports 44 and into pressure chamber 34 for by-passing by valve 60.

The by-passed fluid is utilized to produce this differential as follows: Fluid which passes from the discharge ports 44 into the pressure chamber 34 attains a high velocity in the constricted portion of the venturi-like ports. The velocity energy possessed by this fluid is converted in part to pressure energy as it emerges from the flared portions 48 of the ports and enters the relative quiescence of the large volume pressure chamber 34. There is thus a pressure differential between the throat portion 46 of the discharge ports 44 and pressure chamber 34, and this differential increases with increasing pump speed. The greater pressure, that is the pressure in chamber 34, is the pressure which is imposed on the inner end of valve spool 60. The lower pressure, that is the pressure in the throat 46, is conducted through the passages 50 and exists upstream of the metering restriction 56. Thus, during by-passing operation, the pressure differential across the metering orifice is supplemented by a pressure differential created by utilization of the by-passed fluid. By supplementing the pressure differential across the metering restriction 56 with a pressure differential which is related to discharge rate of the pumping mechanism, a smaller increase in flow rate through the metering restriction is necessary to shift valve 60 to the full open position. Variation in flow rate to the work load is in this manner minimized.

There has thus been provided a low cost, improved flow control system for supplying a substantially constant flow rate to a work load from a variable flow rate source.

While the form of embodiment of the invention as herein disclosed constitutes a preferred form, it is to be understood that other forms might be adopted, all coming within the scope of the claims which follow.

What is claimed is as follows:

1. A fluid flow control system for delivering a substantially constant flow rate to a load from a variable flow rate source, comprising: conduit means connecting the source and load; valve means to divert fluid from said conduit; means for controlling said valve responsive to flow rate to said load; and means for supplementing said controlling means responsive to the flow rate from the source.

2. A fluid flow control system for delivering a substantially constant flow rate to a load from a variable flow rate source, comprising: conduit means connecting the source and load; valve means spring biased to the closed position and shiftable to divert fluid from said conduit; means for producing a pressure differential for shifting said valve against said spring responsive to flow rate to said load; and means for supplementing said pressure differential responsive to the flow rate from the source.

3. A fluid flow control system for delivering a substantially constant flow rate to a load from a variable flow rate source, comprising: first conduit means extending from said source and having flow constrictive means therein for producing a high flow rate; means forming an enlarged chamber into which said constrictive means discharges; second conduit means extending to said load from the first conduit at a point proximate the constrictive means; flow constrictive means in said second conduit; and valve means responsive to the pressure differential between said chamber and a point downstream from the last named constrictive means to divert fluid from a point downstream of said first named constrictive means.

4. A fluid flow control system for delivering a substantially constant flow rate to a load from variable speed pumping mechanism comprising: a limited cross section delivery port in the pumping mechanism, into which the pumped fluid is discharged; an enlarged chamber into which the delivery port is directed; normally closed, spring biased valve means having a pair of opposed areas, one of said areas being exposed to pressure in the chamber and tending to open the valve to provide a modulated by-pass from the chamber; conduit means leading from the delivery port to the load; flow constrictive means in the conduit; and means for conducting pressure from downstream of said flow constrictive means to react on the other of said areas.

5. A fluid flow control system for delivering a substantially constant flow rate to a load from variable speed pumping mechanism, comprising: a delivery port in the pumping mechanism into which the pumped fluid is discharged, said port having a venturi-like cross section with a constricted throat; an enlarged chamber into which the delivery port is directed; normally closed, spring biased valve means having a pair of opposed areas, one of said areas being exposed to pressure in the chamber and tending to open the valve to provide a modulated by-pass from the chamber; conduit means leading from the constricted throat of the delivery port to the load; flow constrictive means in the conduit; and means for conducting pressure from dowstream of said flow constrictive means to react on the other of said areas.

No references cited.